United States Patent
Yoshida

[11] Patent Number: 6,123,373
[45] Date of Patent: Sep. 26, 2000

[54] LOCK DEVICE HAVING AN IMPROVED LOCK MEMBER

[75] Inventor: Hitoshi Yoshida, Kunitachi, Japan

[73] Assignee: TEAC Corporation, Tokyo, Japan

[21] Appl. No.: 09/181,788

[22] Filed: Oct. 28, 1998

[30] Foreign Application Priority Data

Oct. 30, 1997 [JP] Japan .................................. 9-299143

[51] Int. Cl.$^7$ .................................................. E05C 3/04
[52] U.S. Cl. .......................... 292/241; 292/27; 292/197; 292/200; 292/DIG. 63
[58] Field of Search .............................. 411/552; 292/27, 292/46, 49, 197, 98, 200, DIG. 37, DIG. 63, 241

[56] References Cited

U.S. PATENT DOCUMENTS

| | | |
|---|---|---|
| 3,986,627 | 10/1976 | Zapp . |
| 5,129,537 | 7/1992 | Bordner et al. . |
| 5,293,813 | 3/1994 | Schultz . |
| 5,613,424 | 3/1997 | Chameroy et al. . |
| 5,768,976 | 6/1998 | Suk . |

*Primary Examiner*—B. Dayoan
*Assistant Examiner*—John B. Walsh
*Attorney, Agent, or Firm*—Andrus, Sceales, Starke & Sawall

[57] ABSTRACT

A lock device includes a frame which has an opening and a fixed portion internally provided therein. A lid member is hinged to the frame, the lid member being rotatable between an open position and a closed position, the opening of the frame being opened by the lid member at the open position and closed by the lid member at the closed position. A lock member locks the lid member to the frame when the lid member is at the closed position, the lock member including a connecting unit and a rotating unit, the connecting unit configured to be connected to the fixed portion so as to lock the lid member to the frame, the rotating unit configured to be engaged with the connecting unit, the rotating unit actuating the connecting unit so as to connect the connecting unit to the fixed portion when the rotating unit is depressed, the rotating unit actuating the connecting unit so as to lock the lid member to the frame when the rotating unit is rotated, wherein the rotation of the rotating unit is allowed by a disengagement of the rotating unit from the connecting unit caused by the depression of the rotating unit.

8 Claims, 14 Drawing Sheets

FIG. 6
FIG. 7
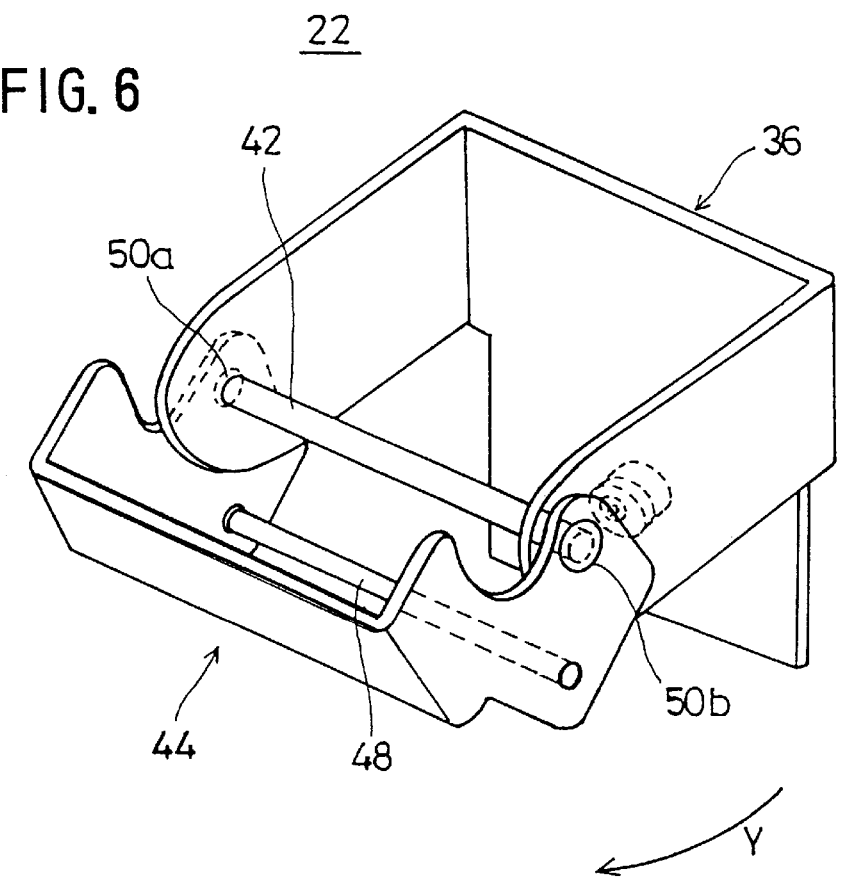
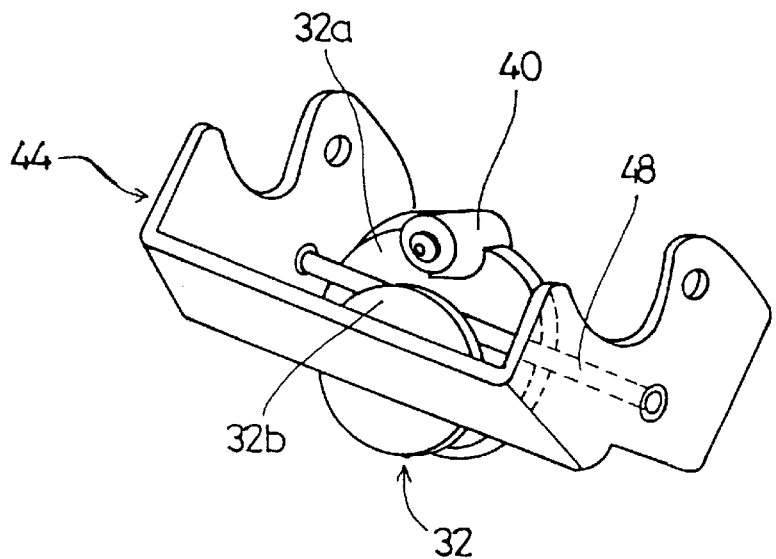

LOCK DEVICE HAVING AN IMPROVED LOCK MEMBER

BACKGROUND OF THE INVENTION (1) Field of the Invention

The present invention relates to a lock device which locks a lid member hinged to a frame, the lid member being rotatable between an open position and a closed position such that an insertion opening of the frame is opened by the lid member at the open position and closed by the lid member at the closed position.

(2) Description of the Related Art

There is an electronic device frame to which an access door is hinged so as to open or close an insertion opening of the frame. In order to ensure a sealing performance of the frame when the insertion opening is closed, a lock device which is provided to lock the access door in the frame is known.

A conventional lock device of the above type includes a rotatable lever with a lock plate attached thereto, and a fixed member provided at an internal portion of the frame. The rotatable lever is provided on an external surface of the access door, and the lock plate is provided inside the access door. When the lever on the external surface of the access door is rotated to a locked position, the lock plate inside the access door is also rotated so that the lock plate is connected to the fixed member. In this condition, the conventional lock device locks the access door of the frame when the access door is at the closed position. A detailed description will be given of a frame to which a conventional lock device is applied, with reference to FIG. 12 through FIG. 14D.

FIG. 12 shows a frame 100 to which a conventional lock device is applied. The frame 100 is an enclosure case which accommodates an electronic device in which electronic circuits and parts are arranged therein.

As shown in FIG. 12, the frame 100 generally includes a frame main part 112, an insertion opening 113, and an access door 118. The access door 118 is a lid member hinged to the main part 112 by using a pair of hinges 114. The access door 118 is rotatable between an open position and a closed position so that the insertion opening 113 is opened by the access door 118 at the open position and closed by the access door 118 at the closed position. A lock member 110 is attached to the access door 118. The lock member 110 includes a rotatable lever with a lock plate attached thereto, which will be described below.

FIG. 13A and FIG. 13B show a construction of the lock member 110 of the conventional lock device of FIG. 12. FIG. 13A is a perspective view of the lock member 110, and FIG. 13B is a side view of the lock member 110.

As shown in FIG. 13A and FIG. 13B, the lock member 110 includes a rotatable lever 126, a lock plate 127, and a shaft 130. The shaft 130 is provided in the form of a cylindrical slender rod. The lever 126 and the lock plate 127 are secured to both ends of the shaft 130 such that the lever 126 and the lock plate 127 extend in opposite parallel directions from the ends of the shaft 130. When the lever 126 is rotated around the shaft 130, the lock plate 127 is also rotated around the shaft 130 together with the lever 126.

In the conventional lock device of FIG. 12, in order to close the insertion opening 113 of the frame 100, the access door 118 is upwardly rotated on the hinges 114 to the closed position which is shown in FIG. 12. On the other hand, in order to open the insertion opening 113, the access door 118 is downwardly rotated on the hinges 114 to the open position which is not shown in the drawings.

FIG. 14A and FIG. 14B show a condition of the conventional lock device of FIG. 12 when the rotatable lever is set in an unlocked position. FIG. 14A is a front view of the conventional lock device, and FIG. 14B is a cross-sectional side view of the conventional lock device.

As shown in FIG. 14A and FIG. 14B, the access door 118 is set in the closed position, and the lever 126 is set in the unlocked position. In order to lock the access door 118 at the closed position, the lever 126 is downwardly rotated around the shaft 130 to a locked position in a direction indicated by the arrow "X" in FIG. 14A. Hereinafter, a condition of the lever 126 when it is set in the unlocked position will be called a horizontal condition, and a condition of the lever 126 when it is set in the locked position will be called an upright condition.

The conventional lock device includes a fixed member 125 of a thin plate material which is provided at an internal upper portion of the main part 112, as shown in FIG. 14A and FIG. 14B. When the lever 126 is set in the unlocked position, the lock plate 127 at the other end of the shaft 130 is separated from the fixed member 125 of the main part 112.

FIG. 14C and FIG. 14D show a condition of the conventional lock device of FIG. 12 when the rotatable lever is set in the locked position. FIG. 14C is a front view of the conventional lock device, and FIG. 14D is a cross-sectional side view of the conventional lock device.

As shown in FIG. 14C and FIG. 14D, when the lever 126 is set in the locked position, the lock plate 127 at the other end of the shaft 130 is connected to the fixed member 125 of the main part 112. As the lock plate 127 of the lock member 110 is connected to the fixed member 125, the access door 118 at the closed position is locked by the lock member 110, which prevents the access door 118 from being rotated on the hinges 114 to the open position.

However, when the frame 100 is used with the above-described conventional lock device, some problems may arise.

In the conventional lock device of FIG. 12, before the access door 118 is rotated on the hinges 114 to the closed position, the lever 126 must be set in the unlocked position (or the horizontal condition) so as to avoid the interference of the lock plate 127 with the main part 112. After the access door 118 is completely rotated to the closed position at which the access door 118 and the main part 112 are fitted to each other, the lever 126 must be set in the locked position (or the upright condition) so as to ensure a sealing performance of the frame 100. If the lever 126 is set in the upright condition before rotating the access door 118 on the hinges 114 to the closed position, the lock plate 127 at the other end of the shaft 130 may interfere with the main part 112. It is difficult for the conventional lock device in such a condition to completely rotate the access door 118 on the hinges 114 to the closed position without interference. Hence, it is difficult for the conventional lock device in such a condition to ensure the sealing performance of the frame 100.

In the conventional lock device of FIG. 12, when the access door 118 is locked by the lock member 110, the rotation of the access door 118 on the hinges 114 toward the open position is inhibited by the connection of the lock plate 127 and the fixed member 125. In order to maintain the lever 128 in the locked position or the upright condition, it is necessary that an adequate level of a frictional force between the lock plate 127 and the fixed member 125 be exerted. If the adequate level of the frictional force is not exerted, the lock plate 127 is easily disconnected from the fixed member 125 so that the lever 128 is rotated toward the unlocked position or the horizontal condition. This causes the access door 118 to be loosely rotated on the hinges 114 toward the open position. Hence, it is difficult for the conventional lock device in such a condition to ensure the sealing performance of the frame 100.

Further, when the frame 100 is used with the conventional lock device over an extended period of time, the relative position of the lock plate 127 to the fixed member 125 is likely to deviate from the original position due to vibrations or deformations of the frame 100. If the relative position of the lock plate 127 to the fixed member 125 deviates such that the lock plate 127 interferes with the fixed member 125 when the lever 126 is located at an intermediate position between the unlocked position and the locked position, it is difficult to rotate the lever 126 to the locked position. Hence, it is difficult for the conventional lock device in such a condition to ensure the sealing performance of the frame 100.

SUMMARY OF THE INVENTION

An object of the present invention is to provide an improved lock device in which the above-described problems are eliminated.

Another object of the present invention is to provide a lock device in which a locking operation of a lock member to lock a lid member is allowed only after an insertion opening of a frame is completely closed by the lid member.

The above-mentioned objects of the present invention are achieved by a lock device comprising: a frame which has an opening and a fixed portion internally provided therein; a lid member which is hinged to the frame, the lid member being rotatable between an open position and a closed position, the opening of the frame being opened by the lid member at the open position and closed by the lid member at the closed position; and a lock member which locks the lid member to the frame when the lid member is at the closed position, the lock member including a connecting unit and a rotating unit, the connecting unit configured to be connected to the fixed portion so as to lock the lid member to the frame, the rotating unit configured to be engaged with the connecting unit, the rotating unit actuating the connecting unit so as to connect the connecting unit to the fixed portion when the rotating unit is depressed, the rotating unit actuating the connecting unit so as to lock the lid member to the frame when the rotating unit is rotated, wherein the rotation of the rotating unit is allowed by a disengagement of the rotating unit from the connecting unit caused by the depression of the rotating unit.

In the lock device of the present invention, when locking the lid member at the closed position, an operator successively performs a connecting operation of the lever and a rotating operation of the lever. A locking operation of the lock member to lock the lid member is allowed only after the insertion opening of the frame main part is completely closed by the lid member. It is possible for the lock device of the present invention to prevent the rotating operation of the lever from being performed before the insertion opening is completely closed by the lid member. Further, the lock device of the present invention is effective in providing reliability when the insertion opening of the frame main part is completely closed by the lid member. If the relative position of the connecting unit and the frame main part deviates from the original position due to vibrations or deformations of the frame main part, the lock device of the present invention in such a condition is effective in providing reliability when the insertion opening of the frame main part is completely closed by the lid member. It is possible for the lock device of the present invention to ensure a sealing performance of the frame main part.

BRIEF DESCRIPTION OF THE DRAWINGS

Other objects, features and advantages of the present invention will be more apparent from the following detailed description when read in conjunction with the accompanying drawings in which:

FIG. 6 is a perspective view of the connecting unit in which the cam engaging part is attached to the supporting base;

FIG. 7 is a perspective view of a part of the lock member in which the cam engaging part of the connecting unit is engaged with the cam of the rotating unit;

DETAILED DESCRIPTION OF THE PREFERRED EMBODIMENTS

A description will now be given of the preferred embodiments of the present invention with reference to the accompanying drawings.

Figure 1:
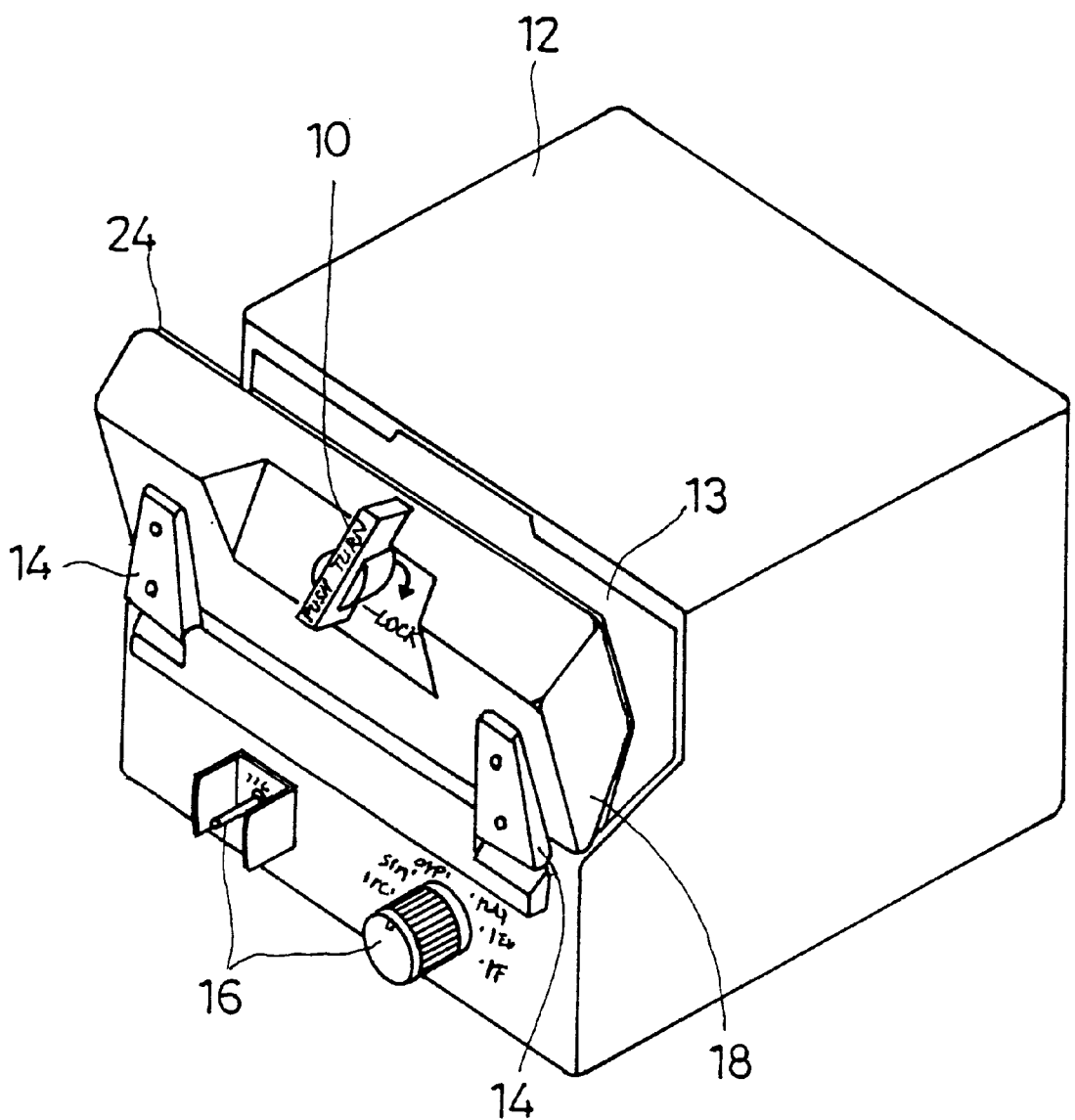
FIG. 1 is a perspective view of a video tape recorder to which one embodiment of a lock device of the present invention is applied.

FIG. 1 shows a video tape recorder 1 to which one embodiment of the lock device of the present invention is applied. The video tape recorder 1 is designed for installation in an aircraft. The video tape recorder 1 generally has a frame main part 12, a pair of hinges 14, a set of control switches 16, an access door 18, and a lock member 10.

The main part 12 is an enclosure case which accommodates electronic circuits and parts arranged within the video tape recorder 1. The main part 12 has an insertion opening 13 provided therein. A video tape cassette (not shown) can be inserted into or withdrawn from the video tape recorder 1 through the insertion opening 13 when the insertion opening 13 is opened.

The control switches 16 are provided on a front surface of the main part 12. The control switches 16 include a power switch, a record switch, a play switch, a stop switch, a fast-forward switch, a rewind switch, and others.

Generally, an electronic device installed in an aircraft is devised to withstand vibrations or impacts to which electronic circuits and parts of the electronic device are subjected. The main part 12 in the present embodiment is constructed in a hermetical structure by using a metallic material having an adequate stiffness, in order to protect the electronic circuits and parts of the video tape recorder 1 against the vibrations or the impacts which may be experienced by the aircraft.

In addition, the main part 12 in the present embodiment is provided with a capability of electromagnetic interference prevention so as to protect the electronic circuits and parts of the video tape recorder 1 against electromagnetic waves which may be experienced by the aircraft. For example, the main part 12 is produced by using an aluminum alloy, and a copper plating layer is formed on the surface of the main part 12.

The access door 18 is produced by using a metallic material which is the same as the material of the main part 12 of the video tape recorder 1. The access door 18 is provided with the capability of electromagnetic interference prevention similar to the main part 12. The lock member 10 is provided on the access door 18. The access door 18 is a lid member hinged to the main part 12 by using the pair of hinges 14. The access door 18 is rotatable between an open position and a closed position so that the insertion opening 13 is opened by the access door 18 at the open position and closed by the access door 18 at the closed position. In addition, a pad 24 of an urethane sponge material is attached to the peripheral portion of the access door 18 which is fitted to the main part 12 when the access door 18 is rotated to the closed position. The pad 24 functions to absorb an impact when the access door 18 at the closed position is fitted to the main part 12, and to provide an increased sealing of the main part 12.

In order to allow a video tape cassette to be inserted into or withdrawn from the video tape recorder 1 through the insertion opening 13, the access door 18 is downwardly rotated to the open position. When the access door 18 is set at the open position, the insertion opening 13 of the main part 12 is opened by the access door 18.

In the lock device of the present embodiment, the lock member 10 includes a rotating unit and a connecting unit, and the connecting unit and the rotating unit are configured such that the locking operation of the lock member 10 to lock the access door 18 is allowed only after the insertion opening 13 of the frame main part 12 is completely closed by the access door 18. The rotating unit and the connecting unit of the lock member 10 are provided on the access door 18.

Figure 2:
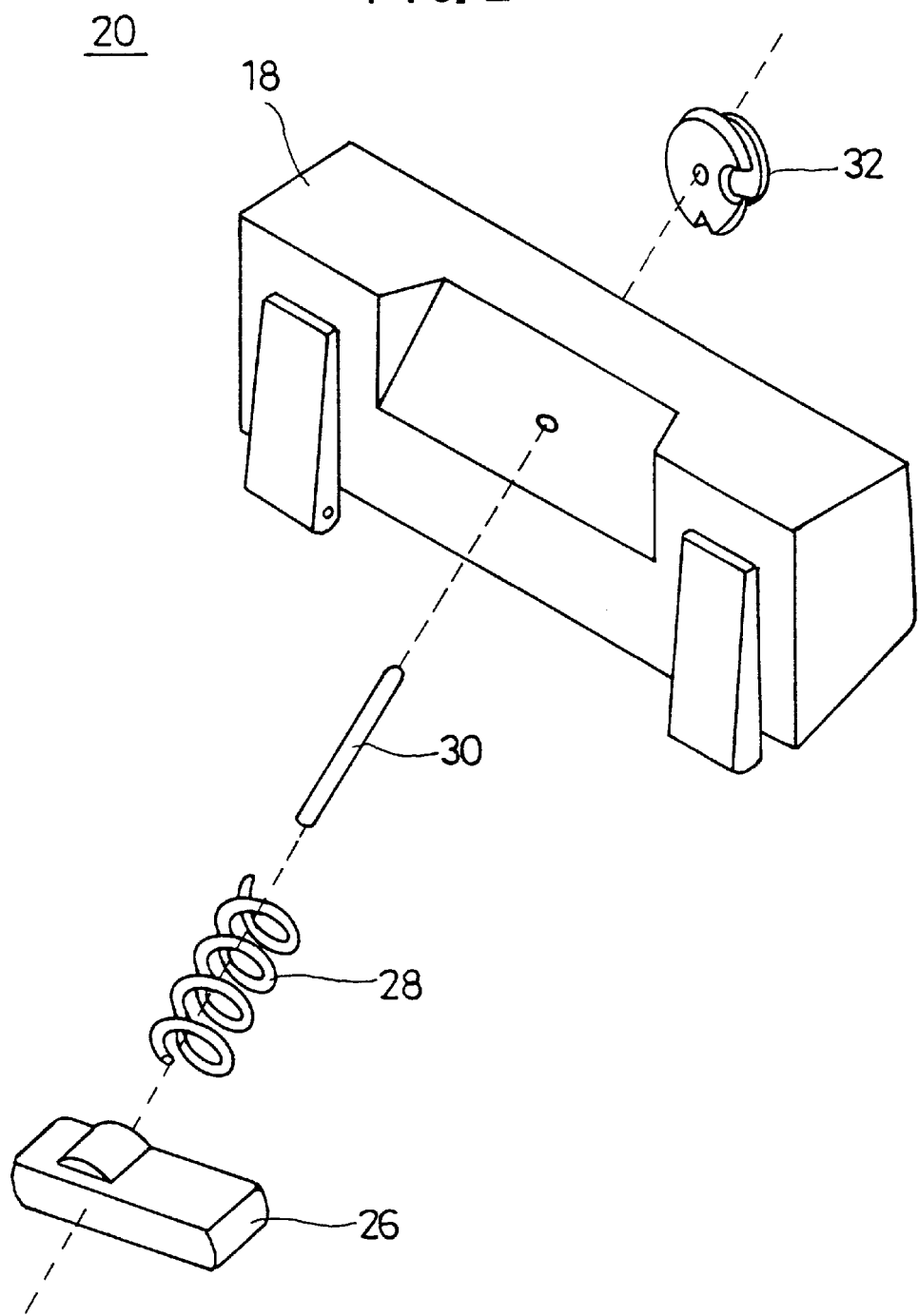
FIG. 2 is a exploded view of a rotating unit of a lock member the lock device of FIG. 1.

FIG. 2 shows a rotating unit 20 of the lock member 10 in the lock device of FIG. 1.

As shown in FIG. 2, the rotating unit 20 includes a lever 26, a spring 28, a shaft 30, and a cam 32. The shaft 30 is provided in the form of a cylindrical slender rod. The cam 32 includes a first disk and a second disk which are integrally formed with an interconnecting shaft. A configuration of the cam 32 will be described below. The spring 28 is a helical compression spring having a coil inside diameter that is slightly larger than an outside diameter of the shaft 30.

Figure 3A:
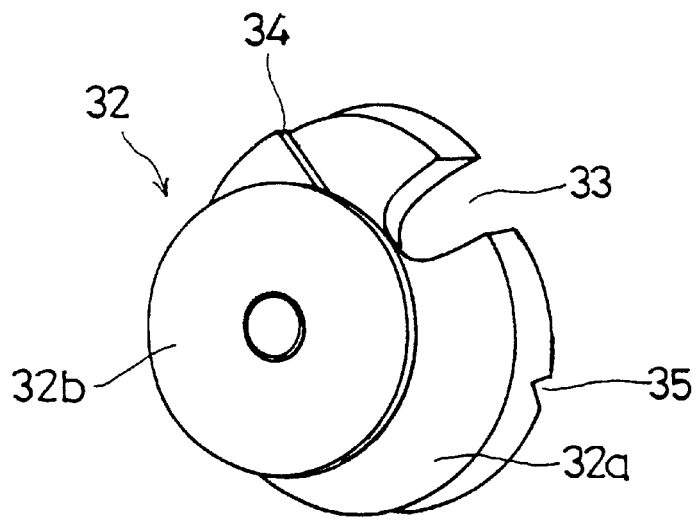
FIG. 3A, FIG. 3B and FIG. 3C are views of a cam of the rotating unit of FIG. 2.
Figure 3B:
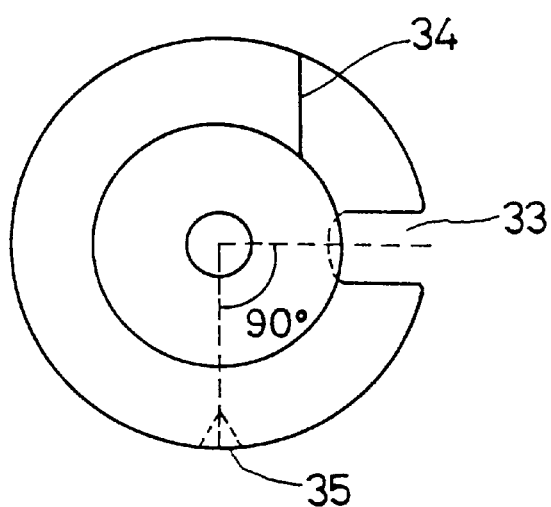
Figure 3C:
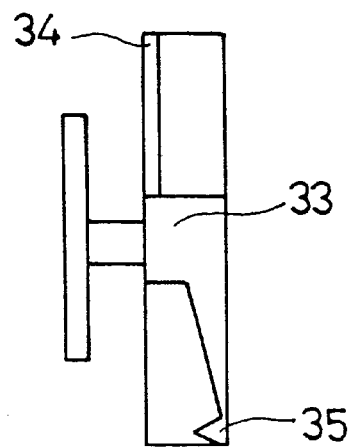

FIG. 3A, FIG. 3B and FIG. 3C show a configuration of the cam 32 of the rotating unit 20. FIG. 3A is a perspective view of the cam 32, FIG. 3B is a front view of the cam 32, and FIG. 3C is a side view of the cam 32.

As shown in FIG. 3A through FIG. 3C, the cam 32 includes a first disk 32a and a second disk 32b which have different diameters and are integrally formed with an interconnecting shaft. The first disk 32a and the second disk 32b are fixed at their centers to both ends of the shaft. The first disk 32a has a diameter that is larger than a diameter of the second disk 32b. The first disk 32a includes a cut-out portion 33 at a peripheral position of the first disk 32a. The first disk 32a includes a stepped portion 34 on an internal surface of the first disk 32a adjacent to the cut-out portion 33. The stepped portion 34 of the first disk 32a confronts an internal surface of the second disk 32b. The first disk 32a includes a V-groove 35 on an external surface of the first disk 32a at a peripheral position thereof that is almost opposite to the stepped portion 34 with respect to the center of the first disk 32a. The V-groove 35 and the cut-out portion 33 are spaced from each other by about 90 degrees around the center of the first disk 32a. The first disk 32a is provided with a slanted wall on the side of the external surface in a region between the V-groove 35 and the cut-out portion 33, and the slanted wall of the first disk 32a has a thickness that is gradually reduced in the direction from the V-groove 35 to the cut-out portion 33.

Referring back to FIG. 2, the rotating unit 20 is arranged such that the lever 26 and the spring 28 are provided on an external surface of the access door 18, the cam 32 is provided on an internal surface of the access door 18, and the shaft 30 on which the spring 28 is mounted is passed through a hole of the access door 18. The lever 26 and the cam 32 are secured to the ends of the shaft 30.

In the rotating unit 20 of the lock member 10, the lever 26 and the cam 32 are secured to the ends of the shaft 30, and the spring 28 is interposed between the lever 26 and the external surface of the access door 18. The spring 28 exerts an actuating force on the lever 26 so as to separate the lever 26 from the access door 18. When no external force acts, the cam 32 at the opposite end of the shaft 30 is pulled toward the internal surface of the access door 18 by the actuating force of the spring 28 on the external surface of the access door 18.

The configuration of the cam 32 shown in FIG. 3A through FIG. 3C is described above for the purpose of giving an example. In the lock device of the present invention, the configuration of the cam of the rotating unit is not limited to this example.

Figure 15A:
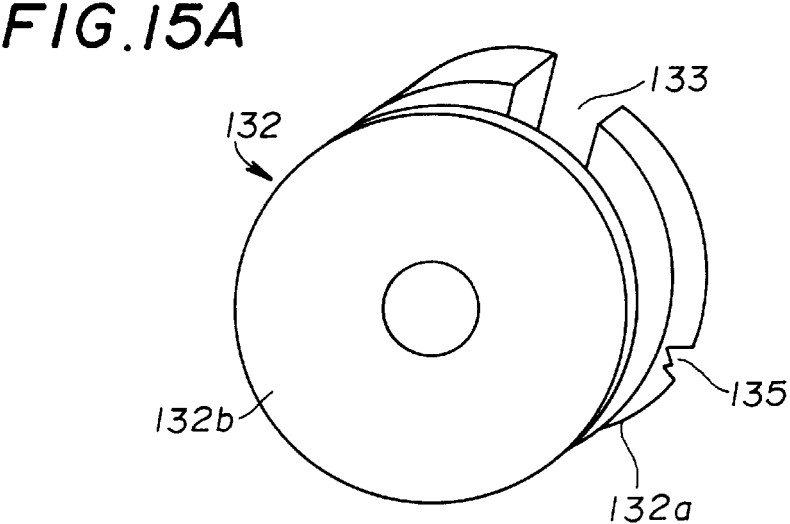
FIG. 15A, FIG. 15B and FIG. 15C are views of another cam of the rotating unit in the lock device of the present invention.
Figure 15B:
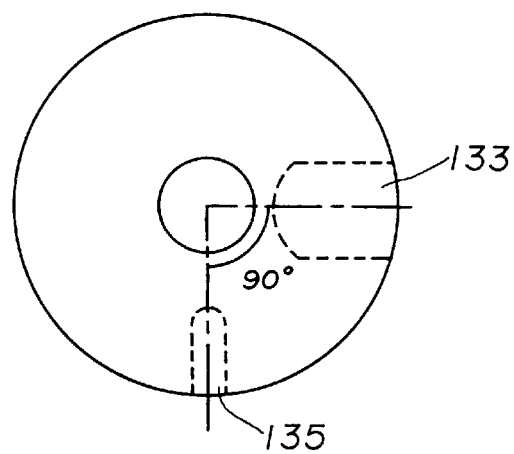
Figure 15C:
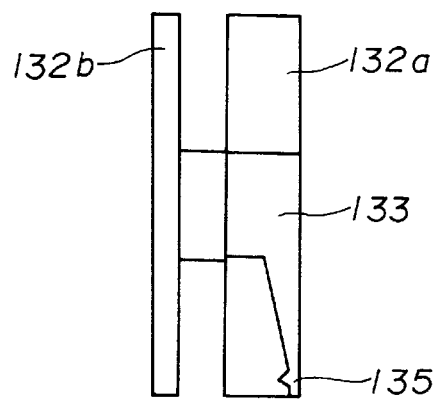

FIG. 15A, FIG. 15B and FIG. 15C show a configuration of another cam 132 of the rotating unit in the lock device of FIG. 1. FIG. 15A is a perspective view of the cam 132, FIG. 15B is a front view of the cam 132, and FIG. 15C is a side view of the cam 132.

As shown in FIG. 15A through FIG. 15C, the cam 132 is a variation of the cam 32 of FIG. 3A through FIG. 3C. The cam 132 includes a first disk 132a and a second disk 132b which have the same diameter and are integrally formed with an interconnecting shaft. The first disk 132a includes a cut-out portion 133 at a peripheral position of the first disk 132a. The first disk 132a includes no stepped portion on the first disk 132a adjacent to the cut-out portion 133. The first disk 132a includes a radially-extending groove 135 on an external surface of the first disk 132a at a peripheral position thereof. The groove 135 and the cut-out portion 133 are spaced from each other by about 90 degrees around the center of the first disk 132a. The first disk 132a is provided with a slanted wall on the side of the external surface thereof in a region between the groove 135 and the cut-out portion 133, and the slanted wall of the first disk 132a has a thickness that is gradually reduced in the direction from the groove 135 to the cut-out portion 133.

It is a matter of course that the cam 132 of FIG. 15A through FIG. 15C may be incorporated in the lock device of FIG. 1 in a manner similar to the cam 32 of FIG. 3A through FIG. 3C.

Next, FIG. 4A through FIG. 6 show the elements of the connecting unit of the lock member 10 of FIG. 1. The connecting unit 22 in the present embodiment includes a supporting base 36 and a cam engaging part 44.

Figure 4A:
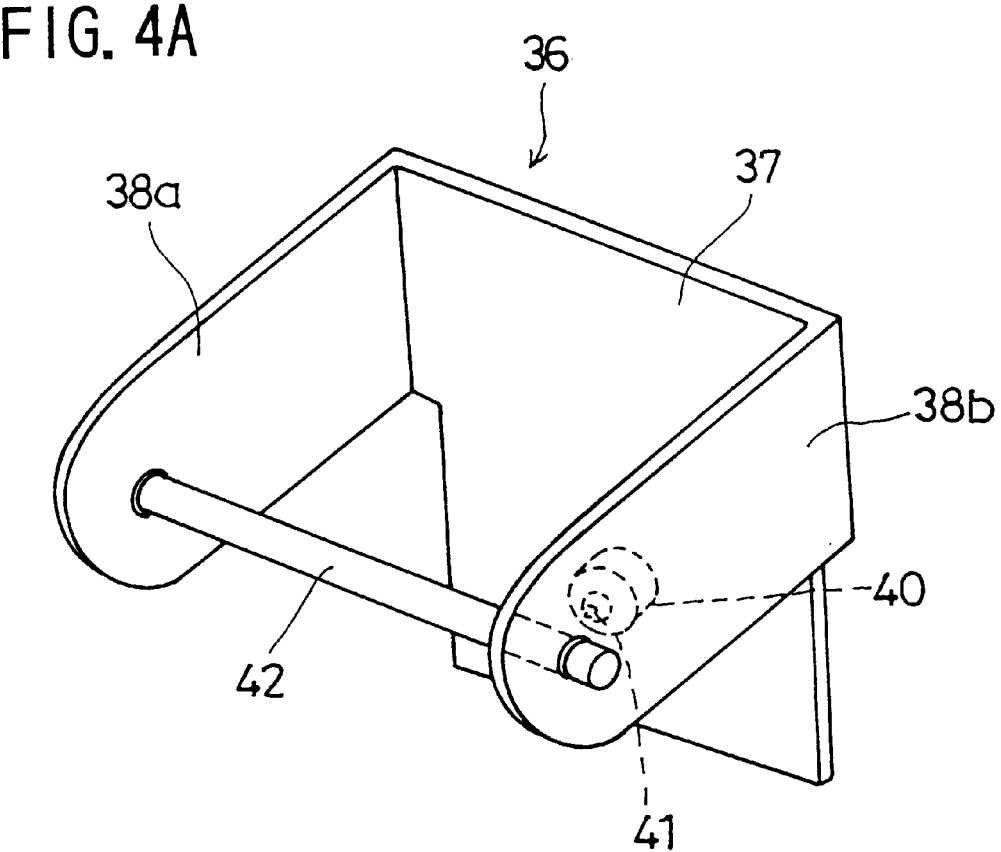
FIG. 4A and FIG. 4B are views of a supporting base of a connecting unit of the lock member.
Figure 4B:
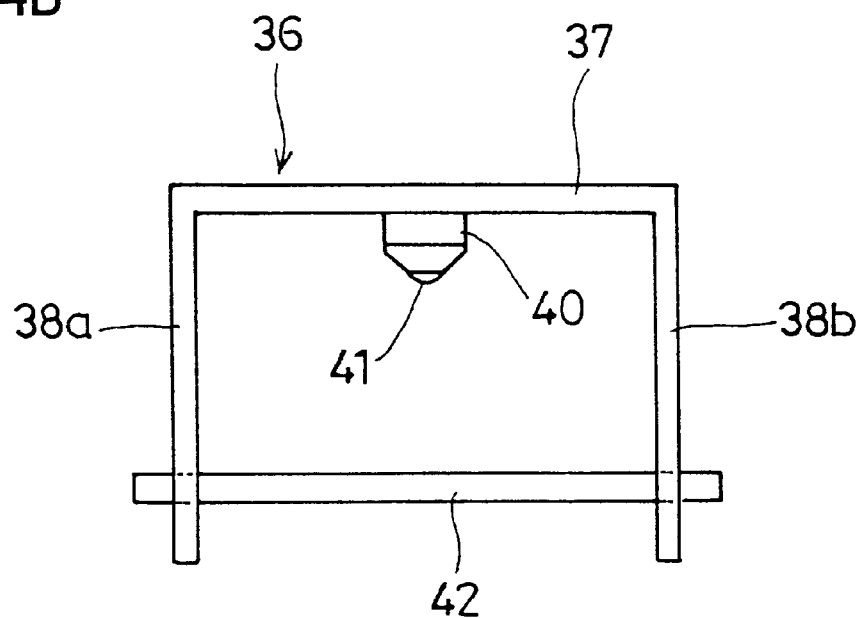

FIG. 4A is a perspective view of the supporting base 36 of the connecting unit 22 in the present embodiment, and FIG. 4B is a top view of the supporting base 36 of the connecting unit 22 in the present embodiment. The supporting base 36 is secured to the internal surface of the access door 18 at a given position.

As shown in FIG. 4A and FIG. 4B, the supporting base 36 includes a rectangular plate 37, a cylindrical stopper 40, a pair of arm portions 38a and 38b, and a laterally extending shaft 42. The plate 37 is secured to the internal surface of the access door 18 at the given position. The stopper 40 is embedded in the plate 37 at a central position of the plate 37. The stopper 40 projects from an internal surface of the plate 37 in a direction parallel to the arm portions 38a and 38b. The arm portions 38a and 38b extend from side edges of the plate 37 in directions perpendicular to the plate 37. The shaft 42 is laterally provided between end portions of the arm portions 38a and 38b and extends in a lateral direction parallel to the internal surface of the plate 37.

A ball 41 is provided at a top of the stopper 40 on the supporting base 36, and the ball 41 is engaged with the external surface of the first disk 32a of the cam 32 when the cam 32 is rotated around the shaft 30. The ball 41 is rotatably fitted into the stopper 40 in order to reduce friction between the ball 41 and the cam 32 when the cam 32 is rotated. Hence, the ball 41 functions as a ball bearing that movably supports the cam 32 when the ball 41 is engaged with the cam 32. Further, a screw (not shown) is fastened to a threaded base of the stopper 40 on the side opposite to the ball 41, and a leading edge of the screw fastened to the stopper 40 is brought into contact with the bottom of the ball 41. In the present embodiment, a height of the ball 41 that projects from the top of the stopper 40 is determined by adjusting the amount of fastening the screw to the stopper 40.

In the present embodiment, the stopper 40 of the supporting base 36 is fitted in the cut-out portion 33 of the cam 32 of the rotating unit 20. When the stopper 40 is fitted in the cut-out portion 33 of the cam 32, the rotation of the cam 32 and the lever 27 around the shaft 30 is inhibited by the engagement between the cutout portion 33 of the rotating unit 20 and the stopper 40 of the connecting unit 22.

Figure 5A:
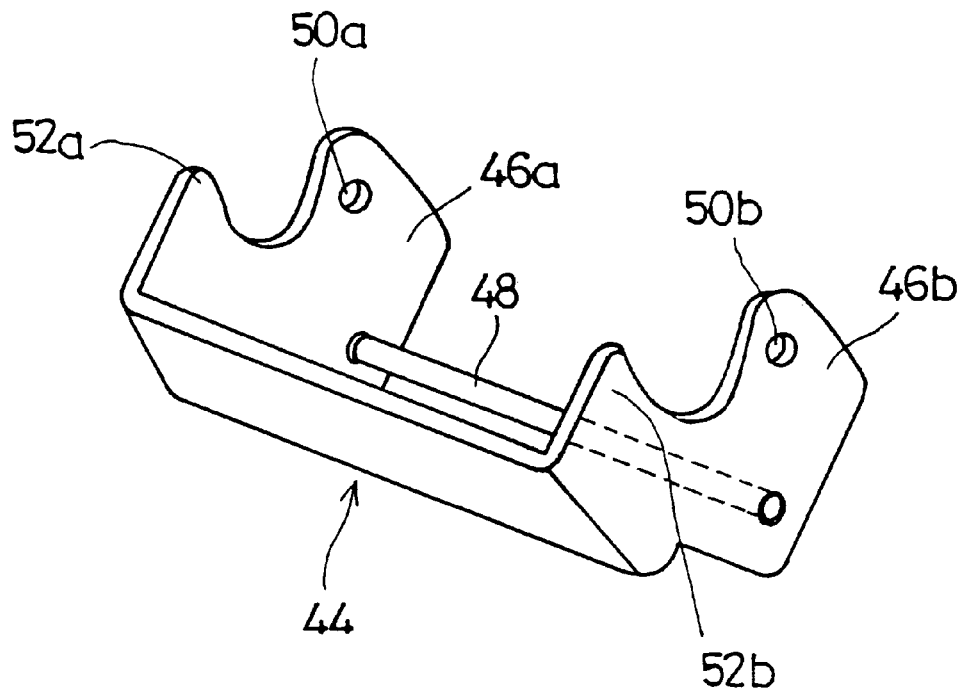
FIG. 5A and FIG. 5B are views of a cam engaging part of the connecting unit of the lock member.
Figure 5B:
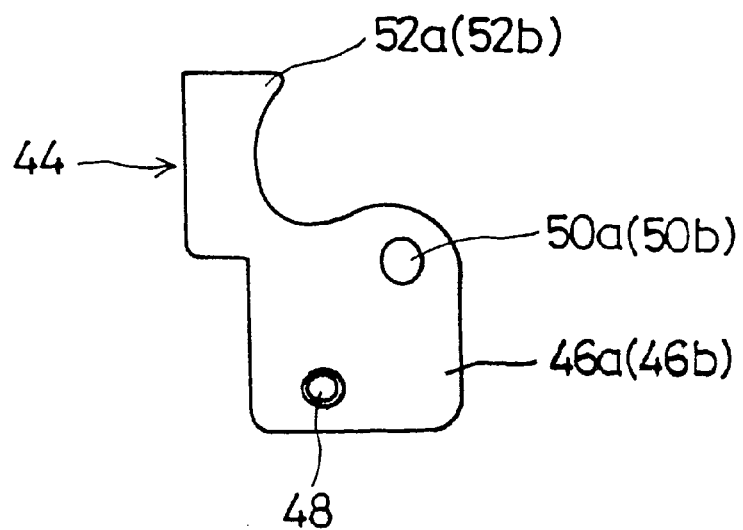

FIG. 5A is a perspective view of the cam engaging part 44 of the connecting unit 22 in the present embodiment, and FIG. 5B is a side view of the cam engaging part 44 of the connecting unit 22 in the present embodiment.

As shown in FIG. 5A and FIG. 5B, in the cam engaging part 44, a pair of side walls 46a and 46b which extend from side edges of a rectangular base plate in directions perpendicular to the base plate are provided. A cam engaging shaft 48 is provided between the side walls 46a and 46b, and extends in a lateral direction parallel to the base plate. The cam engaging shaft 48 is a cylindrical slender rod. The side wall 46a includes a hole 50a and a connecting portion 52a, and the side wall 46b includes a hole 50b and a connecting portion 52b.

FIG. 6 shows the connecting unit 22 in which the cam engaging part 44 is attached to the supporting base 36.

As shown in FIG. 6, the shaft 42 of the supporting base 36 is inserted at both ends into the holes 50a and 50b of the cam engaging part 44. By the connection of the shaft 42 and the holes 50a and 50b, the cam engaging part 44 is rotatably supported on the supporting base 36. As indicated by the arrow "Y" in FIG. 6, the cam engaging part 44 is rotatable around the shaft 42.

FIG. 7 shows a part of the lock member 10 in which the cam engaging part 44 of the connecting unit 22 is engaged with the cam 32 of the rotating unit 20.

As shown in FIG. 7, when the cam engaging part 44 is engaged with the cam 32, the cam engaging shaft 48 is fitted in the internal space between the first disk 32a and the second disk 32b of the cam 32. A movement of the cam 32 in the axial direction of the shaft 30 is transmitted to the cam engaging part 44 through the connection of the shaft 48 and the cam 32.

Next, a description will be given of the operation of the lock device of the present embodiment with reference to FIG. 8A through FIG. 11D.

In the lock device of the present embodiment, in order to lock the access door 18 at the closed position, a connecting operation of the lever 26 and a rotating operation of the lever 26 are successively performed by an operator of the video tape recorder 1. In the present embodiment, a pair of fixed portions 54a and 54b are provided at internal upper positions of the frame main part 12 (which will be described below).

When the connecting operation of the lever 26 is performed by the operator, the lever 26 on the external surface of the access door 18 is depressed in the axial direction of the shaft 30 against the actuating force of the spring 28. By the depression of the lever 26, the cam 32 at the other end of the shaft 30 is also moved in the axial direction of the shaft 30. This movement of the cam 32 is transmitted to the cam engaging part 44 through the connection of the shaft 48 and the cam 32. The connecting portions 52a and 52b of the cam engaging part 44 mounted on the internal surface of the access door 18 are connected to the fixed portions 54a and 54b of the frame main part 12 by the engagement of the rotating unit 20 and the connecting unit 22. A detailed description of the operation of the lock device of the present embodiment when the connecting operation of the lever 26 is performed by the operator will be given below.

When the rotating operation of the lever 26 is performed by the operator after the end of the connecting operation, the lever 26, which is depressed toward the access door 18, is rotated to the locked position around the shaft 30. After the rotating operation is performed, the lock member 10 locks the access door 18 at the closed position. A detailed description of the operation of the lock device of the present embodiment when the rotating operation of the lever 26 is performed by the operator will be given below.

Figure 8A:
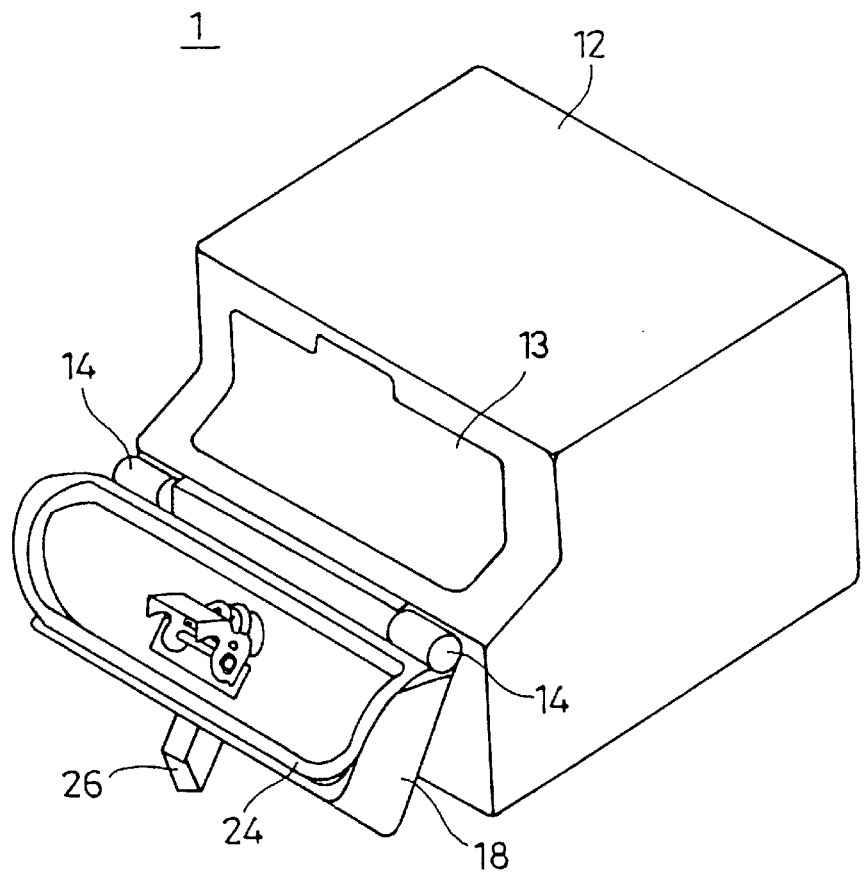
FIG. 8A and FIG. 8B are views of the lock device of the present embodiment when an access door is set in an open position.
Figure 8B:
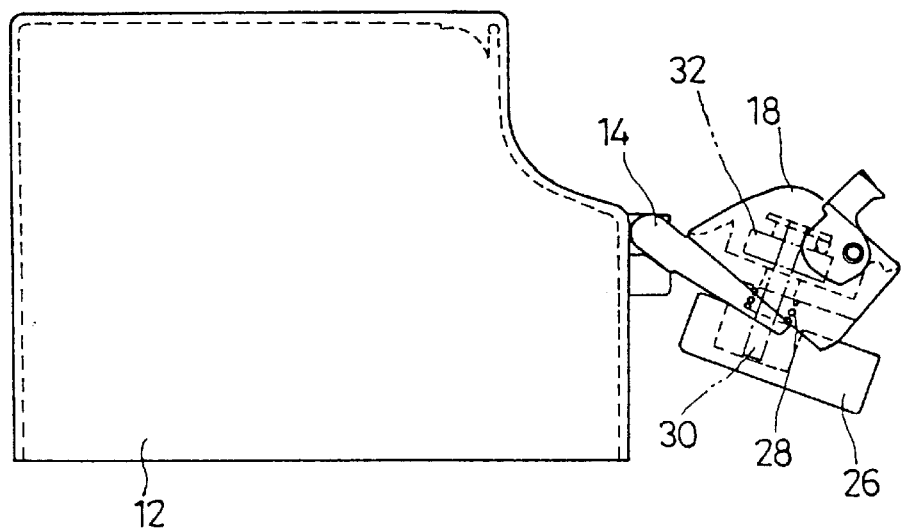

FIG. 8A and FIG. 8B show the lock device of the present embodiment when the access door 18 is set in the open position. FIG. 8A is a perspective view of the lock device of the present embodiment in this condition, and FIG. 8B is a side view of the lock device of the present embodiment in this condition.

As shown in FIG. 8A and FIG. 8B, the access door 18 is downwardly rotated on the hinges 14 so that the access door 18 is set in the open position. The insertion opening 13 of the frame main part 12 is opened by the access door 18. The hinges 14 attached to the access door 18 downwardly extend from the pivotal points on the frame main part 13. In this condition, a video tape cassette (not shown) can be inserted into or withdrawn from the video tape recorder 1. The spring 28 exerts the actuating force on the lever 26 so as to separate the lever 26 from the external surface of the access door 18. The cam 32 at the opposite end of the shaft 30 is pulled toward the internal surface of the access door 18 by the actuating force of the spring 28 on the external surface of the access door 18.

Figure 9A:
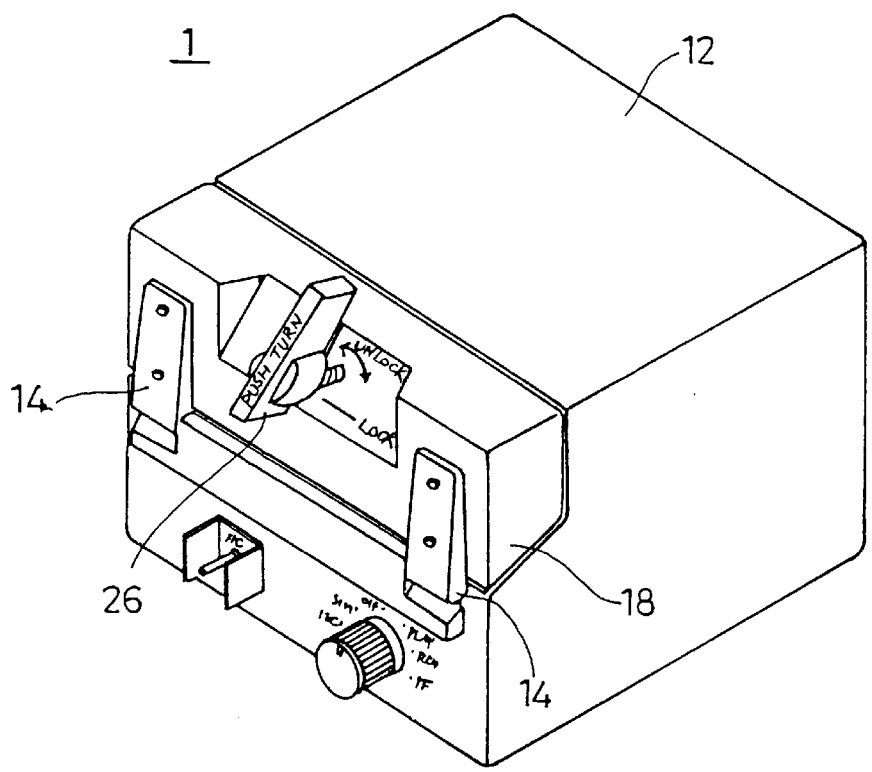
FIG. 9A and FIG. 9B are views of the lock device of the present embodiment when the access door is set in a closed position.
Figure 9B:
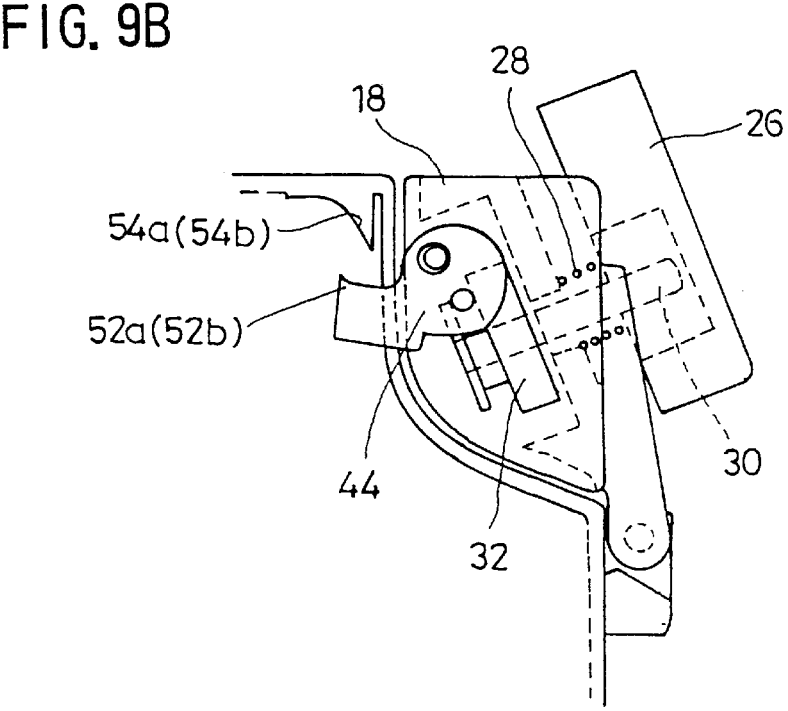

FIG. 9A and FIG. 9B show the lock device of the present embodiment when the access door 18 is set in the closed position with the lever 26 being set in the unlocked position. FIG. 9A is a perspective view of the lock device of the present embodiment in this condition, and FIG. 9B is a side view of the lock device of the present embodiment in this condition.

As shown in FIG. 9A and FIG. 9B, the access door 18 is upwardly rotated on the hinges 14 so that the access door 18 is set in the closed position. The access door 18 in this condition matches with the frame main part 12. The insertion opening 13 of the frame main part 12 is closed by the access door 18. The spring 28 exerts the actuating force on the lever 26 so as to separate the lever 26 from the external surface of the access door 18. The cam 32 at the opposite end of the shaft 30 is pulled toward the internal surface of the access door 18 by the actuating force of the spring 28 on the external surface of the access door 18. In this condition, the connecting portions 52a and 52b of the cam engaging part 44 mounted on the internal surface of the access door 18 are disconnected from the fixed portions 54a and 54b of the frame main part 12 as shown in FIG. 9B. That is, the insertion opening 13 of the frame main part 12 is not completely closed by the access door 18 in this condition. Further, in this condition, the stopper 40 on the supporting base 36 inside the access door 18 is fitted in the cut-out portion 33 of the cam 32, and the rotation of the cam 32 and the lever 26 around the shaft 30 is inhibited by the engagement between the cut-out portion 33 of the rotating unit 20 and the stopper 40 of the connecting unit 22. That is, the locking operation of the lock member 10 to lock the access door 18 is inhibited at this time.

Figure 10A:
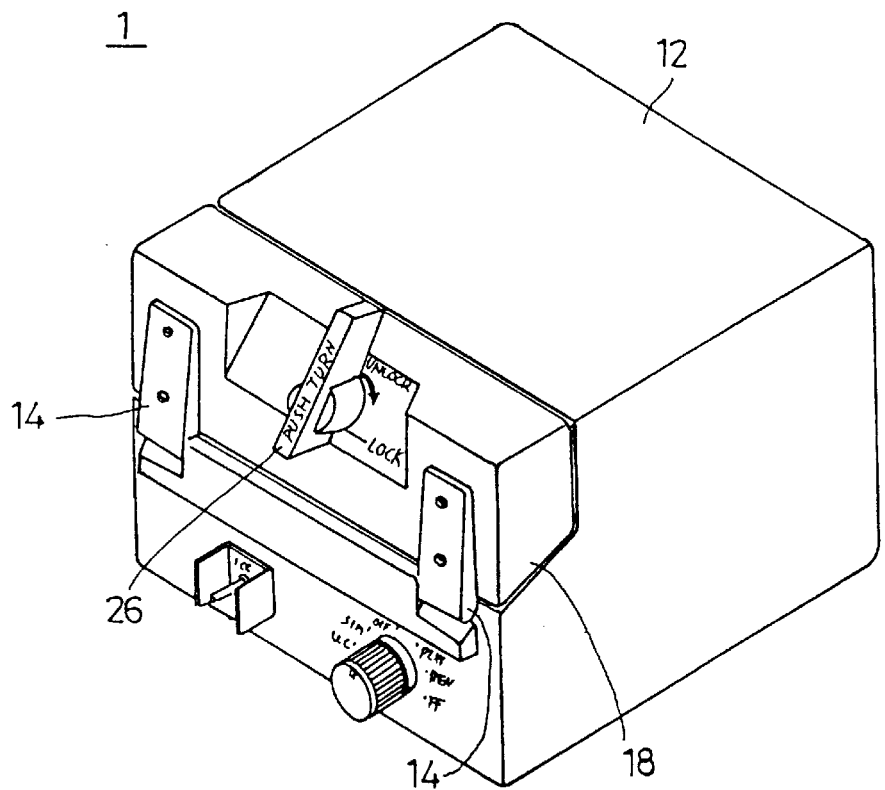
FIG. 10A and FIG. 10B are views of the lock device of the present embodiment when the access door is set in the closed position and a connecting operation of the lever is performed.
Figure 10B:
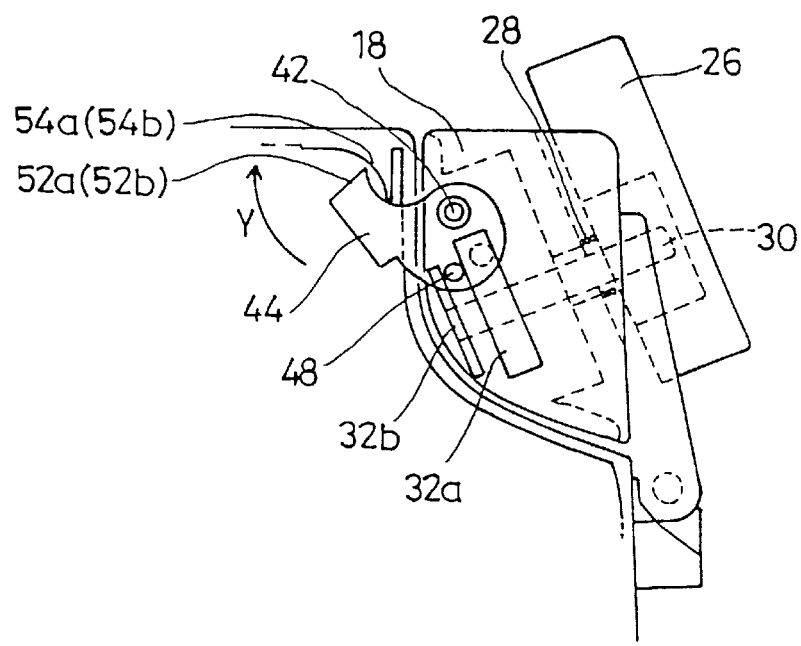

FIG. 10A and FIG. 10B show the lock device of the present embodiment when the access door 18 is set in the closed position and the connecting operation of the lever 26 is performed. FIG. 10A is a perspective view of the lock device of the present embodiment in this condition, and FIG. 10B is a side view of the lock device of the present embodiment in this condition.

As shown in FIG. 10A and FIG. 10B, when the connecting operation of the lever 26 is performed by the operator, the lever 26 on the external surface of the access door 18 is depressed in the axial direction of the shaft 30 against the actuating force of the spring 28. By the depression of the lever 26, the cam 32 at the other end of the shaft 30 is also moved in the axial direction of the shaft 30 toward the inside of the frame main part 12. This movement of the cam 32 is transmitted to the cam engaging part 44 through the connection of the shaft 48 and the cam 32. At this time, the shaft 48, which is interposed between the first disk 32a and the second disk 32b, is moved together with the cam 32 in the axial direction of the shaft 30 toward the inside of the frame main part 12.

As previously described, the shaft 42 of the supporting base 36 on the internal surface of the access door 18 is inserted into the holes 50a and 50b of the cam engaging part 44. By the connection of the shaft 42 and the holes 50a and 50b, the cam engaging part 44 is rotatably supported on the supporting base 36, and the cam engaging part 44 is rotatable around the shaft 42. As the shaft 48 is moved in the axial direction of the shaft 30 toward the inside of the frame main part 12, the cam engaging part 44 on which the shaft 48 is mounted is upwardly rotated around the shaft 42, as indicated the arrow "Y" in FIG. 10B. Hence, the connecting portions 52a and 52b of the cam engaging part 44 are connected to the fixed portions 54a and 54b of the frame main part 12 by the engagement of the rotating unit 20 and the connecting unit 22. That is, the insertion opening 13 of the frame main part 12 is completely closed by the access door 18.

Further, when the connecting operation of the lever 26 is performed, the lever 26 is depressed in the axial direction of the shaft 30, and the cam 32 is moved in the axial direction of the shaft 30 toward the inside of the frame main part 12. By this movement of the cam 32, the cut-out portion 33 of the cam 32 is disconnected from the stopper 40 on the supporting base 36. At this time, the rotation of the lever 26 and the cam 32 around the shaft 30 is allowed by the disengagement of the rotating unit 20 from the connecting unit 22 (or the disengagement of the cut-out portion 33 from the stopper 40). That is, the locking operation of the lock member 10 to lock the access door 18 is possible.

FIG. 11A, FIG. 11B, FIG. 11C and FIG. 11D show the operation of the lock member 10 in the lock device of the present embodiment.

Figure 11A:
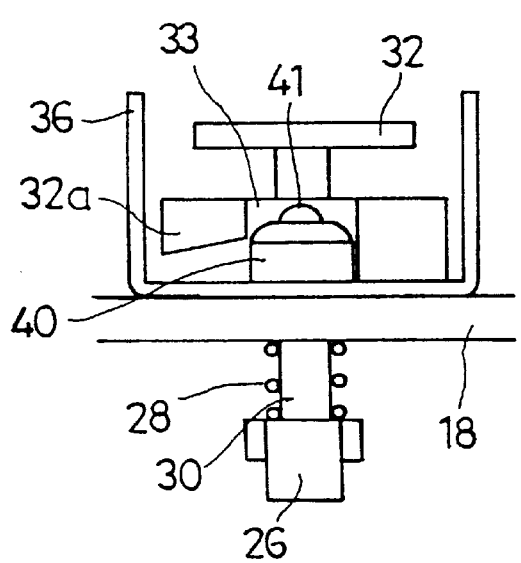
FIG. 11A, FIG. 11B, FIG. 11C and FIG. 11D are diagrams for explaining the operation of the lock member in the lock vice of the present embodiment.
Figure 11B:
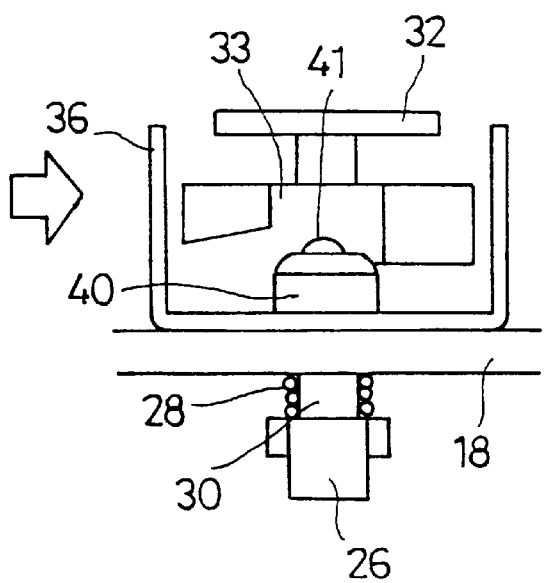

FIG. 11A shows a condition of the lock member 10 when neither the connecting operation nor the rotating operation is performed to the lever 26. FIG. 11B shows a condition of the lock member 10 when the connecting operation of the lever 26 is performed. As shown in FIG. 11B, the lever 26 on the external surface of the access door 18 is depressed in the axial direction of the shaft 30 against the actuating force of the spring 28. By the depression of the lever 26, the cam 32 at the other end of the shaft 30 is also moved in the axial direction of the shaft 30 toward the inside of the frame main part 12. By this movement of the cam 32, the cut-out portion 33 of the cam 32 is disconnected from the stopper 40 on the supporting base 36, and the rotation of the lever 26 and the cam 32 around the shaft 30 is allowed by the disengagement of the cut-out portion 33 from the stopper 40.

Figure 11C:
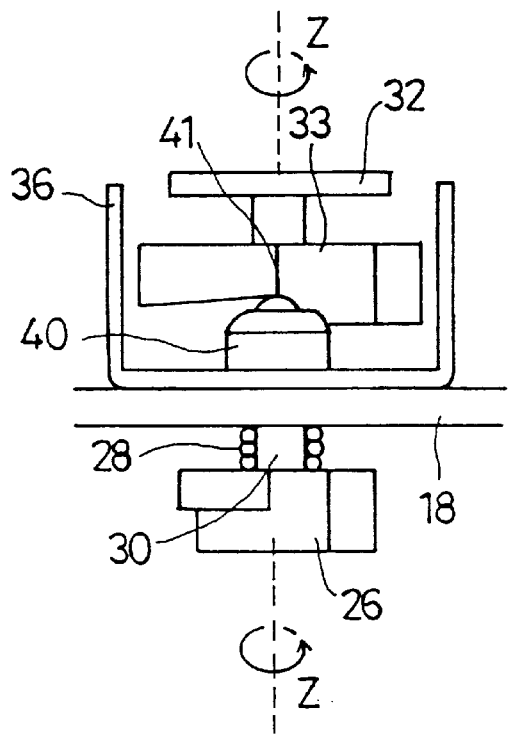

FIG. 11C shows a condition of the lock member 10 when the rotating operation of the lever 26 is performed after the end of the connecting operation. As shown in FIG. 11C, while the lever 26 is depressed toward the external surface of the access door 18, the lever 26 is rotated around the shaft 30 in a direction indicated by the arrow "Z" in FIG. 11C.

Figure 11D:
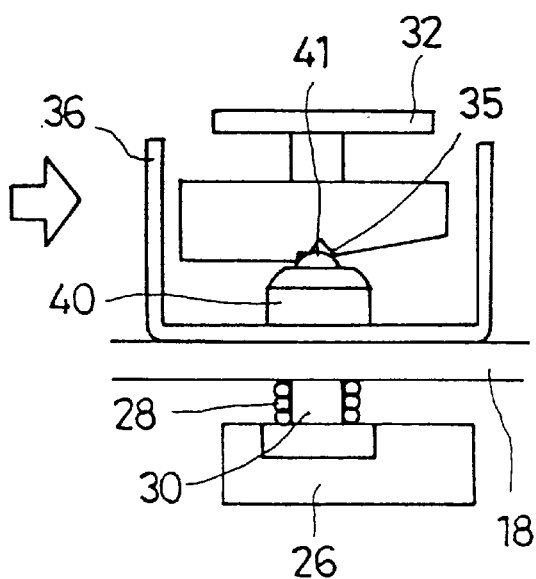
Figure 12:
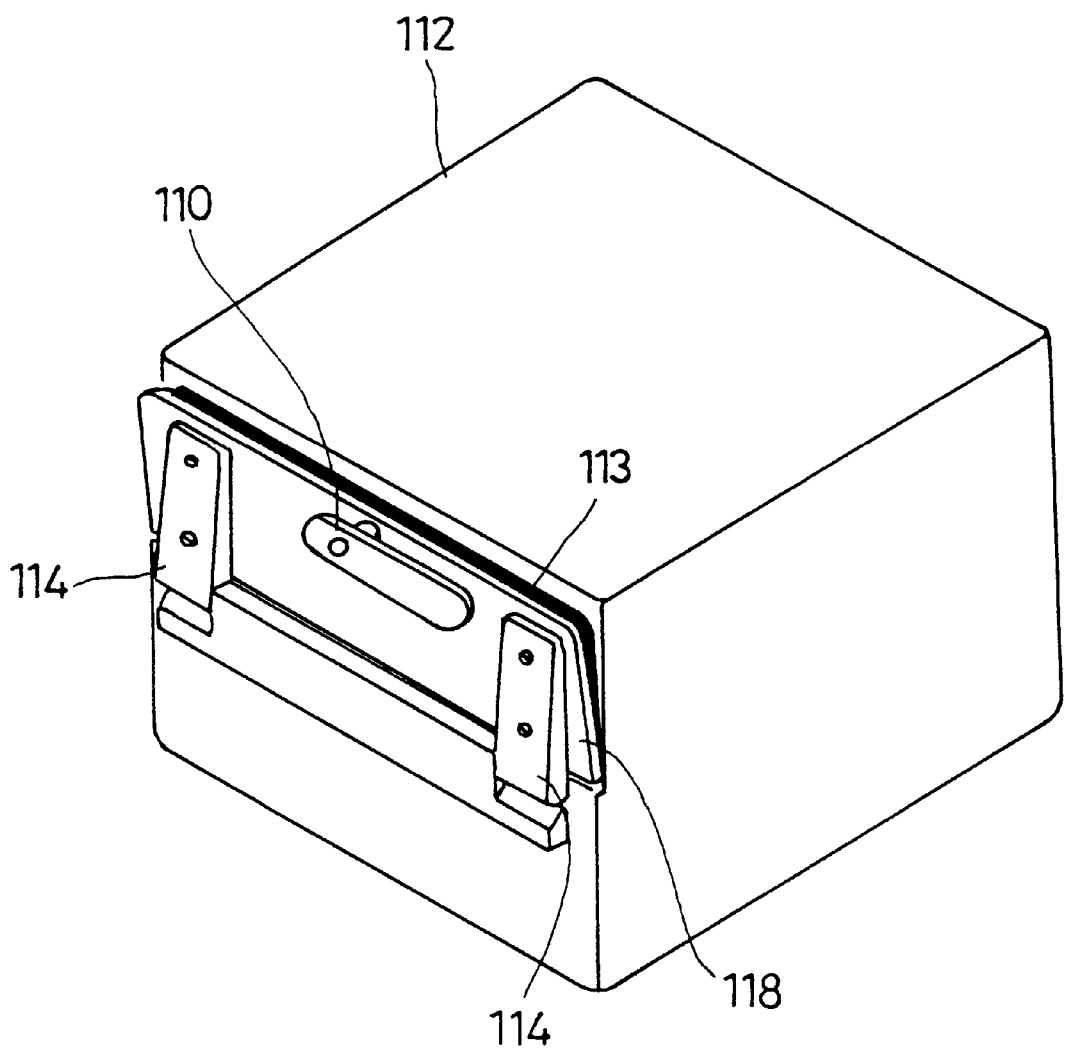
FIG. 12 is a perspective view of a frame to which a conventional lock device is applied.
Figure 13A:
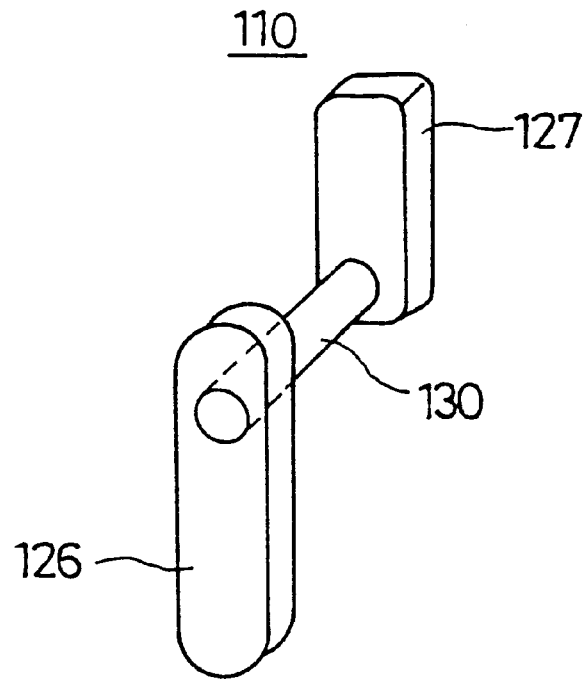
FIG. 13A and FIG. 13B are views of a lock member of the convention lock device.
Figure 13B:
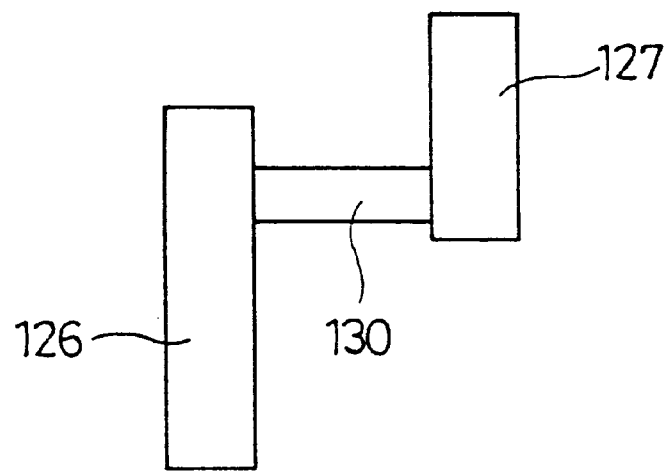
Figure 14A:
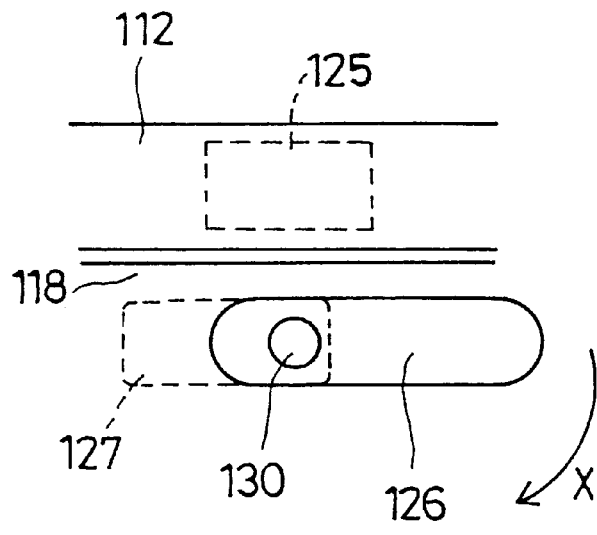
FIG. 14A, FIG. 14B, FIG. 14C and FIG. 14D are diagrams showing both conditions of the conventional lock device when a rotatable lever is set in an unlocked position and when it is set in a locked position.
Figure 14B:
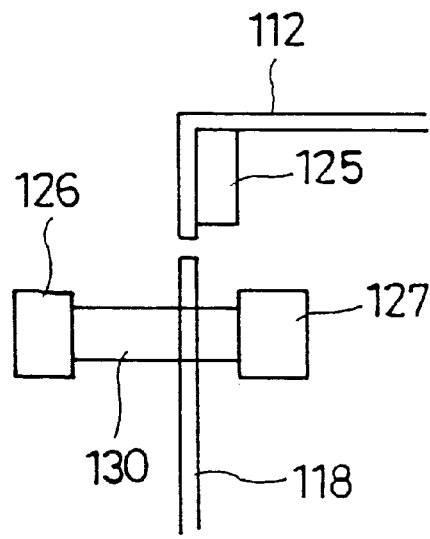
Figure 14C:
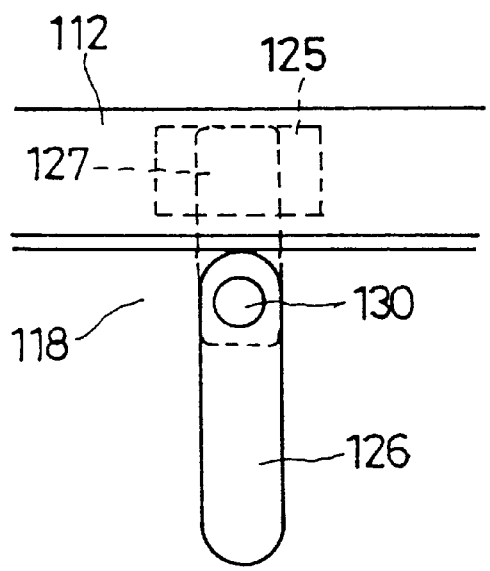
Figure 14D:
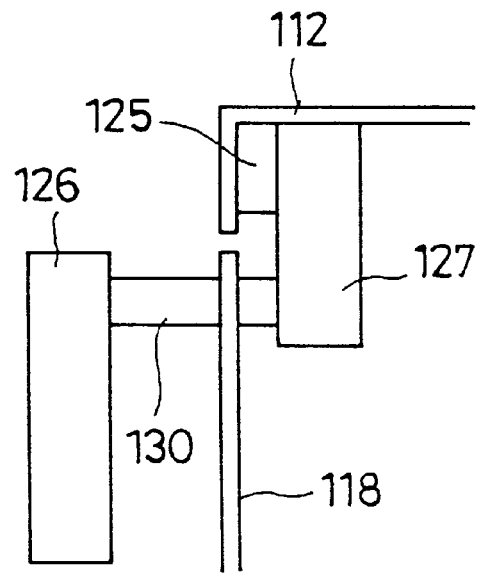

FIG. 11D shows a condition of the lock member 10 after the rotating operation of the lever 26 is performed. As shown in FIG. 11D, the lever 26 is rotated about 90 degrees around the shaft 30 to the locked position. In accordance with the rotation of the lever 26, the cam 32 is rotated around the shaft 30, and the V-groove 35 at the peripheral position on the external surface of the first disk 32a is fitted to the ball 41 on the top of the stopper 40 on the supporting base 36. The rotating operation of the lever 26 is stopped by the connection of the V-groove 35 and the ball 41.

In the present embodiment, the ball 41 is rotatably fitted into the stopper 40 in order to reduce friction between the ball 41 and the cam 32 when the cam 32 is rotated. The ball 41 functions as a ball bearing that movably supports the cam 32 when the ball 41 is engaged with the cam 32. Further, the screw (not shown) is fastened to the threaded base of the stopper 40 on the side opposite to the ball 41, and the leading edge of the screw fastened to the stopper 40 is brought into contact with the bottom of the ball 41. The height of the ball 41 that projects from the top of the stopper 40 is determined by adjusting the amount of fastening the screw to the stopper 40. Further, the slanted wall of the first disk 32a has a thickness that is gradually reduced in the direction from the V-groove 35 to the cut-out portion 33. Therefore, when the lever 26 is rotated to the locked position while the lever 26 is depressed toward the access door 18, the cam 32 can be smoothly rotated around the shaft 30 until the V-groove 35 of the first disk 32a is fitted to the ball 41 on the top of the stopper 40.

As described above, when locking the access door 18 at the closed position in the lock device of the present embodiment, the operator successively performs the connecting operation of the lever 26 and the rotating operation of the lever 26. The locking operation of the lock device of the present embodiment to lock the access door 18 is allowed only after the insertion opening 13 of the frame main part 12 is completely closed by the access door 18. It is possible for the lock device of the present embodiment to prevent the rotating operation of the lever 26 from being performed before the insertion opening 13 is completely closed by the access door 18.

Further, the first disk 32a of the cam 32, which is engaged with the stopper 40, has the slanted wall in the region between the V-groove 35 and the cut-out portion 33 on the side of the external surface, and the slanted wall of the first disk 32a has a thickness that is gradually reduced in the direction from the V-groove 35 to the cut-out portion 33. When the lever 26 is rotated to the locked position after the end of the connecting operation, the cam 32 can be gradually separated from the internal surface of the access door 18 in accordance with the rotation of the cam 32 around the shaft 30 from the cut-out portion 33 to the V-groove 35. The shaft 48, which is interposed between the first disk 32a and the second disk 32b, can be gradually moved together with the cam 32 in the axial direction of the shaft 30 toward the inside of the frame main part 12. The cam engaging part 44 on which the shaft 48 is mounted can be gradually rotated around the shaft 42 by the gradual movement of the shaft 48. Hence, the connecting portions 52a and 52b of the cam engaging part 44 can be smoothly connected to the fixed portions 54a and 54b of the frame main part 12 by the engagement of the rotating unit 20 and the connecting unit 22. Therefore, the lock device of the present embodiment is effective in providing reliability when the insertion opening 13 of the frame main part 12 is completely closed by the access door 18.

When the video tape recorder 1 is used with the lock device of the present embodiment over an extended period of time, the relative position of the connecting portions 52a and 52b of the connecting unit 22 to the fixed portions 54a and 54b of the frame main part 12 is likely to deviate from the original position due to vibrations or deformations experienced by the video tape recorder 1. If the relative position of the connecting unit 22 and the frame main part 12 deviates, the lock device of the present embodiment in such a condition is effective in providing reliability when the insertion opening 13 of the frame main part 12 is completely closed by the access door 18. It is possible for the lock device of the present embodiment to ensure a sealing performance of the frame main part 12.

Further, the present invention is not limited to the above-described embodiments, and variations and modifications may be made without departing from the scope of the present invention.

What is claimed is:

1. A lock device comprising:
   a frame having an opening and a fixed portion internally provided therein;
   a lid member hinged in the frame, the lid member being rotatable between an open position and a closed position, the opening of the frame being opened by the lid member at the open position and closed by the lid member at the closed position; and
   a lock member for locking the lid member to the frame when the lid member is at the closed position, the lock member including a connecting means movable between an unlock position and a lock position for connection to the frame when in the lock position to lock the lid member to the frame, and a rotating means which has an axis of rotation and is axially movable along the axis of rotation, when depressed, from a first position to a second position, said rotating means being enabled, by the depressing movement, for rotation about the axis of rotation between said second position and a third position for engaging and actuating the connecting means to move the connecting means from the unlock position to the lock position when the rotating unit is depressed from the first position to the second position, and the rotating means is rotated from the second position to the third position.

2. The lock device according to claim 1, wherein the lid member has an external surface and an internal surface, the connecting means includes a cam engaging part rotatably supported on the internal surface of the lid member, and the rotating means includes a shaft passed through the lid member, a rotatable lever fixed to an end of the shaft on the external surface of the lid member, and a rotatable cam fixed to the other end of the shaft on the internal surface of the lid member, the cam being actuated toward the internal surface of the lid member, wherein, when the lever is rotated around the shaft, the cam is rotated by the rotation of the lever to upwardly rotate the cam engaging part such that a portion of the cam engaging part is connected to the fixed portion of the lid member, thereby locking the lid member to the frame.

3. The lock device according to claim 2, wherein the rotating means includes a cut-out portion formed at a peripheral position of the cam, and the connecting means includes a supporting base and a stopper provided on the supporting base, the cut-out portion being engaged with the stopper on the supporting base, wherein, when the lever is depressed in an axial direction of the shaft toward the inside of the frame, the cam is moved in the axial direction by the depression of the lever, causing the cut-out portion to be disengaged from the stopper on the supporting base.

4. The lock device according to claim 3, wherein the connecting means includes a ball rotatably fitted to a top of the stopper on the supporting base, the ball being engaged with the cam when the cam is rotated around the shaft, the ball movably supporting the cam when the ball is engaged with the cam.

5. The lock device according to claim 2, wherein the cam of the rotating means includes a first disk and a second disk which are fixed at their centers to both ends of an interconnecting shaft, the first disk including a cut-out portion and a groove at peripheral positions, the peripheral positions being spaced apart from each other by a given angle around the center of the first disk.

6. The lock device according to claim 5, wherein the first disk of the cam is provided with a slanted wall in a region between the groove and the cut-out portion, the slanted wall having a thickness that is gradually reduced in a direction from the groove to the cut-out portion.

7. The lock device according to claim 2, wherein the connecting means includes a base plate provided in the cam engaging part, a pair of side walls extending from side edges of the base plate in directions perpendicular to the base plate, and a laterally extending shaft provided between the side walls, each of the side walls including a connecting portion, the connecting portions of the side walls being connected to the fixed portion of the frame.

8. The lock device according to claim 2, wherein the connecting means includes a laterally extending shaft, the laterally extending shaft being connected to the cam, and, when the lever is depressed in an axial direction of the shaft of the rotating unit toward the inside of the frame, the laterally extending shaft is moved in the axial direction together with the cam.

* * * * *